United States Patent
Nagoshi et al.

(10) Patent No.: US 6,467,866 B1
(45) Date of Patent: Oct. 22, 2002

(54) PRINT CONTROL METHOD AND APPARATUS, AND PRINTING APPARATUS USING THE SAME

(75) Inventors: Shigeyasu Nagoshi; Masao Kato, both of Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/087,505

(22) Filed: May 29, 1998

(30) Foreign Application Priority Data

May 30, 1997 (JP) ............................................. 9-142693

(51) Int. Cl.$^7$ ............................................... B41J 2/205
(52) U.S. Cl. ........................................................ 347/15
(58) Field of Search ............................ 347/15, 41, 43, 347/14, 23, 42, 19, 40, 9, 12, 37, 17

(56) References Cited

U.S. PATENT DOCUMENTS

| | | | | |
|---|---|---|---|---|
| 4,313,124 A | | 1/1982 | Hara ....................... 346/140 R |
| 4,345,262 A | | 8/1982 | Shirato et al. .......... 346/140 R |
| 4,459,600 A | | 7/1984 | Sato et al. ............... 346/140 R |
| 4,463,359 A | | 7/1984 | Ayata et al. ................. 346/1.1 |
| 4,558,333 A | | 12/1985 | Sugitani et al. ........ 346/140 R |
| 4,608,577 A | | 8/1986 | Hori ........................ 346/140 R |
| 4,673,951 A | * | 6/1987 | Mutoh et al. .................. 347/41 |
| 4,723,129 A | | 2/1988 | Endo et al. .................... 346/1.1 |
| 4,740,796 A | | 4/1988 | Endo et al. .................... 346/1.1 |
| 4,872,027 A | * | 10/1989 | Buskirk et al. ............... 347/19 |
| 5,225,849 A | | 7/1993 | Suzuki et al. ................. 347/15 |
| 5,594,478 A | * | 1/1997 | Matsubara et al. ........... 347/15 |
| 5,610,638 A | | 3/1997 | Courtney ...................... 347/14 |
| 5,818,474 A | | 10/1998 | Takahashi et al. ............ 347/15 |
| 5,831,642 A | * | 11/1998 | Matsubara et al. ........... 347/15 |

FOREIGN PATENT DOCUMENTS

| | | | |
|---|---|---|---|
| JP | 54-056847 | 5/1979 | |
| JP | 59-123670 | 7/1984 | |
| JP | 59-138461 | 8/1984 | |
| JP | 60-071260 | 4/1985 | |
| JP | 60-107975 | 6/1985 | |
| JP | 2-3326 | 1/1990 | ................... 347/15 |
| JP | 2-289355 | 11/1990 | ................... 347/15 |
| JP | 5-155050 | 6/1993 | ................... 347/14 |
| JP | 6-40038 | 2/1994 | |
| JP | 6-320743 | 11/1994 | ................... 347/23 |
| JP | 7-52390 | 2/1995 | ................... 347/15 |
| JP | 7-60969 | 3/1995 | ................... 347/15 |
| JP | 8-118683 | 5/1996 | ................... 347/23 |
| JP | 8-174909 | 7/1996 | ................... 347/15 |
| JP | 8-230177 | 9/1996 | ................... 347/15 |
| WO | 95/31334 | 11/1995 | ................... 347/15 |

* cited by examiner

*Primary Examiner*—John Barlow
*Assistant Examiner*—Charles W. Stewart, Jr.
(74) *Attorney, Agent, or Firm*—Fitzpatrick, Cella, Harper & Scinto

(57) ABSTRACT

A print control method and apparatus for performing printing by executing image processing on inputted image data and generating print data to be outputted to a printer, and a printer using the print control method and apparatus. First, the highest density value of the inputted image data is reduced by a predetermined amount, and the image data is subjected to binarization for generating print data to be inputted. Alternately, masking processing is performed on the image data by using a mask pattern which is generated in accordance with the type of ink, the color of ink or the type of print medium, so as to prevent dots that are consecutive in a printed image, thus preventing image deterioration.

29 Claims, 17 Drawing Sheets

⊘ PRINTED IN 1ST PASS
○ PRINTED IN 2ND PASS
× REMOVED DOT

8 × 8 MASK

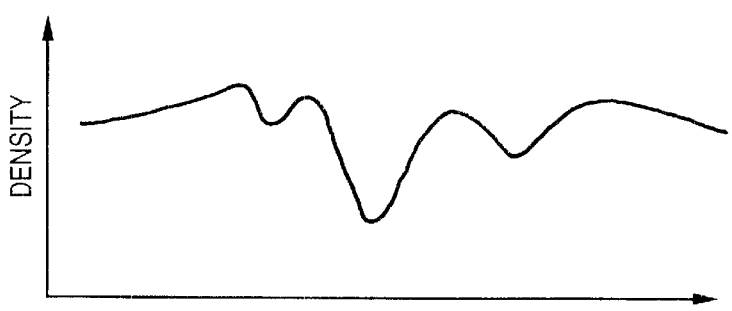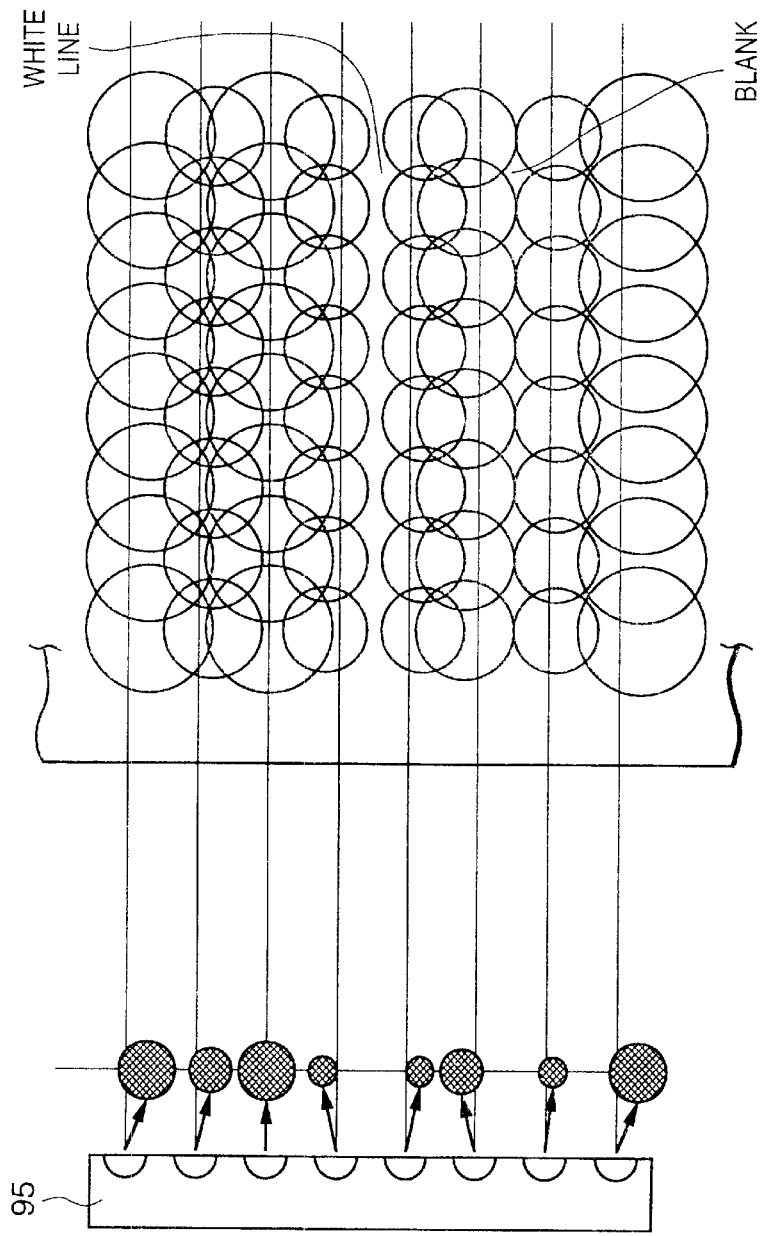

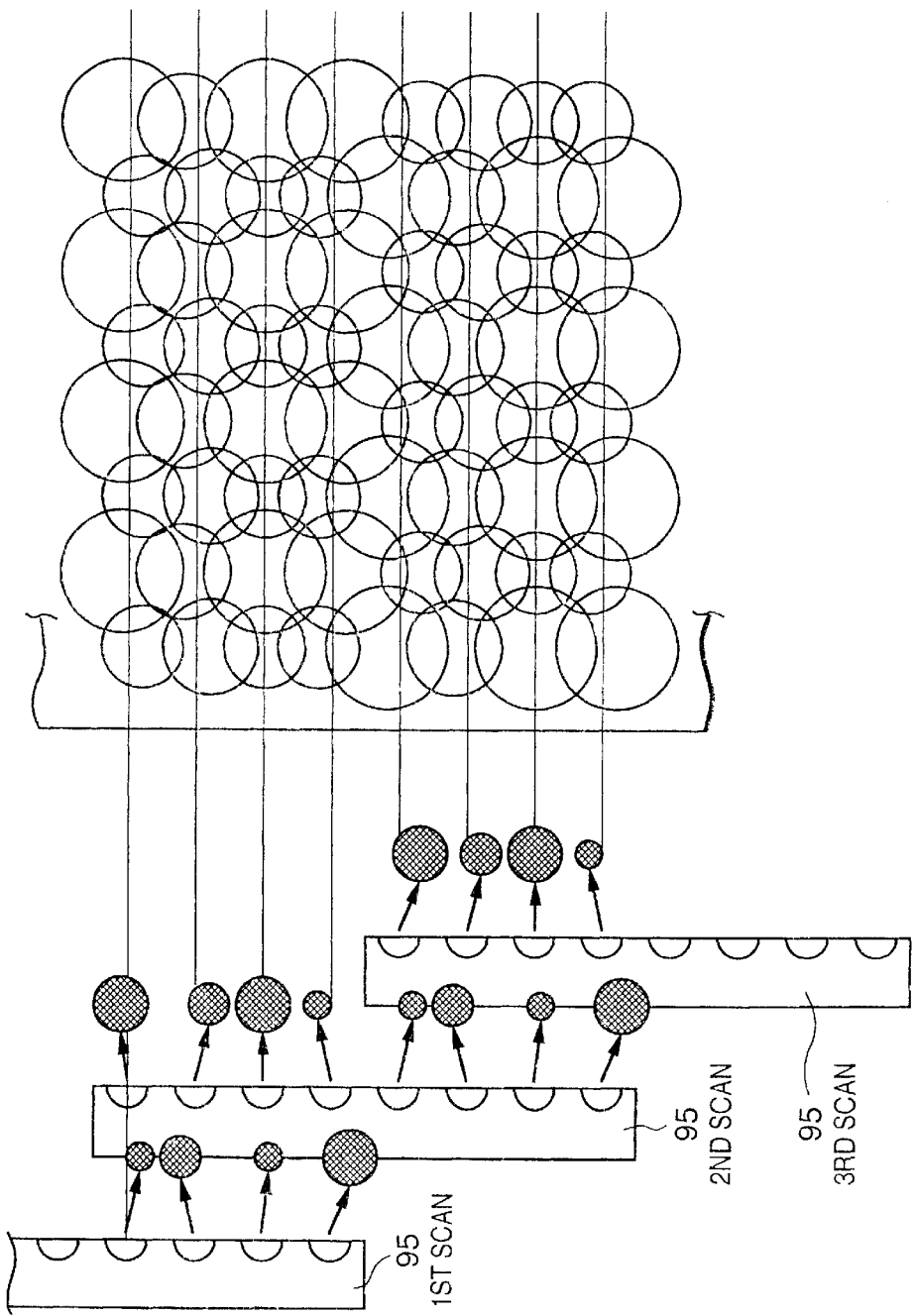

- ⊘ CHECKER PATTERN
- ○ REVERSE CHECKER PATTERN

- ⊘ CHECKER PATTERN
- ○ REVERSE CHECKER PATTERN

- ⊘ CHECKER PATTERN
- ○ REVERSE CHECKER PATTERN

PRINT CONTROL METHOD AND APPARATUS, AND PRINTING APPARATUS USING THE SAME

BACKGROUND OF THE INVENTION

The present invention relates to a print control method and print control apparatus for controlling a printer which prints an image on a print medium by using a printhead, and a printer using the same.

Specific examples on density unevenness generated by an ink-jet printer will be described with reference to FIGS. 12A to 12C and FIGS. 13A to 13C, taking a single color ink-jet head 91 as an example.

In FIG. 12A, reference numeral 91 denotes an ink-jet head. To simplify the explanation, the drawing shows a case where the ink-jet head 91 comprises eight nozzles 92. Reference numeral 93 denotes ink droplets discharged by each of the nozzles 92. It is ideal when the ink droplets, each having a uniform discharge amount, are discharged in the same direction as shown in FIG. 12A. If such discharge operation is realized, dots having a uniform size are formed on a print paper as shown in FIG. 12B, achieving an image as shown in FIG. 12C in which there is no density unevenness in the nozzle array direction of the ink-jet head 91.

However, in the ink-jet head 95 (FIG. 13A) used in reality, the shape and ink discharge characteristic of each of the nozzles vary. If the ink-jet head 95 is driven similarly to the case of FIG. 12A to perform printing, the size and direction of ink droplets discharged by each of the nozzles varies as shown in FIG. 13A. Therefore, the dots formed on a print paper by the discharged ink droplets are not uniform as shown in FIG. 13B. More specifically, as can be seen from FIG. 13B, high and low density portions appear periodically in the main-scanning direction of the ink-jet head 95, or plural dots unnecessarily overlap with each other, or a white line (non-printed portion) is generated as shown in the central portion of FIG. 13B. The aggregated dots formed in such condition have the density distribution shown in FIG. 13C, which corresponds to the nozzle array direction of the ink-jet head 95. In this case, density unevenness is clearly visible by human eyes. Moreover, such conspicuous line is attributable not only to the ink-jet head 95 but also to an uneven paper-conveyance amount.

To reduce such density unevenness and a white omission line between adjacent raster lines, Japanese Patent Application Laid-Open (KOKAI) No. 60-107975 proposes the following method adopted to a monochrome ink-jet printer.

The method is now briefly described with reference to FIGS. 14A to 14C and FIGS. 15A to 15C. According to this method, the ink-jet head 95 is scanned three times to print the area shown in FIGS. 12A to 12C or FIGS. 13A to 13C. The area corresponding to four pixels, which is printed by half of the nozzles of the ink-jet head 95, is printed by scanning twice. In other words, the eight nozzles of the ink-jet head 95 are divided into two groups: four nozzles in the upper side and four nozzles in the lower side. In the first scanning operation, the four nozzles in the lower side of the ink-jet head 95 are used to print every other pixels, and in the second scanning operation, the four nozzles in the upper side of the ink-jet head 95 are used to scan the same area and print dots in the portion skipped by the first scanning operation, whereby completing printing of the area of interest. The above-described printing method is called fine printing. Adopting the fine printing method to the ink-jet head 95 shown in FIG. 13A enables to reduce the influence of uneven nozzles over a printed image. Therefore, as shown in FIG. 14B, the printed image does not have conspicuous black lines or white lines which are generated in FIG. 13B. Also in this case, density unevenness is relatively reduced as shown in FIG. 14C, as compared to FIG. 13C.

When performing printing in the foregoing manner, image data is divided so as to complement each other in accordance with a predetermined arrangement in the first and second scanning operations. FIGS. 15A to 15C show the examples of image data arrangement (masked pattern). The image data arrangement in FIGS. 15A to 15C shows a checker pattern in which image data is divided to print every other pixels in the vertical and horizontal directions. Therefore, to complete print operation of a unit area (a unit of four pixels in this case), a checker pattern is printed in the first scanning and a reverse checker pattern is printed in the second scanning operation.

FIGS. 15A to 15C show how the print operation of a predetermined area is completed when a checker mask pattern and a reverse checker mask pattern are alternatively used, by utilizing an ink-jet head having eight nozzles similarly to the case of FIGS. 12A to 12C–14A to 14C.

In the first scanning operation, the checker pattern is printed by using the four nozzles in the lower side of the ink-jet head (FIG. 15A). In the second scanning operation, the print paper is conveyed for a distance corresponding to four pixels and the reverse checker pattern is printed by using all the nozzles of the ink-jet head (FIG. 15B). Note that in FIGS. 15A to 15C, the dots (circles) indicated by hatching represent the dots printed by the checker pattern (FIGS. 15A and 15C), while the dots without hatching represent the dots printed by the reverse checker pattern (FIG. 15B). Further in the third scanning operation, the print paper is conveyed again for a distance corresponding to four pixels (½ of all nozzles) and the checker pattern is printed again by using the four nozzles in the upper side of the ink-jet head (FIG. 15C). By alternately performing the sequential paper conveyance in units of four pixels and the printing operation of a checker pattern or a reverse checker pattern as described above, printing an area in units of four pixels is completed per one scanning.

In a case of performing printing by the aforementioned multi-scanning, various mask patterns are used to remove pixel data in each scanning operation. Examples thereof are the aforementioned checker pattern and reverse checker pattern type, horizontal-line type, vertical-line type, or a type where the mask pattern (image-correspondence type mask) changes in accordance with image data and so forth. The image-correspondence type mask is a pattern in which printing orders are predetermined in raster units. For example, assuming a case of performing printing by scanning twice, in the first scan, the first dot of the first raster line is printed (shown as white circle in FIG. 16); the second dot of the first raster line is not printed (shown as black circle in FIG. 16); and this is repeated for the third and subsequent dots of the first raster line. Then, the first dot of the second raster line is not printed (shown as black circle in FIG. 16); the second dot of the second raster line is printed (white circle in FIG. 16); and this is repeated for the third and subsequent dots of the second raster line. The arrangement of dots to be printed in the first scan (pass) is determined in this manner.

Next, in the second scan, the first dot of the first raster line is not printed (shown as white circle in FIG. 16); the second dot of the first raster line is printed (black circle in FIG. 16); and this is repeated for the third and subsequent dots of the first raster line. Then, the first dot of the second raster line is printed (black circle in FIG. 16); the second dot of the second raster line is not printed (white circle in FIG. 16); and this is repeated for the third and subsequent dots of the second raster line.

By setting the arrangement of dots to be printed in each raster, the checker mask pattern and reverse checker mask pattern are printed as shown in FIG. 16. The mask data used in this case is determined in accordance with, for instance, the image shown in FIG. 17. FIG. 17 shows an image in which only the first dot of the second raster is apart from other dots. In the image in FIG. 17, dots of the second raster are printed from the first dot in the order of "not print", "print" . . . , in the first scan. As can be seen in FIG. 17, printed dots of the first raster through the third raster create a vertical-consecutive pattern (vertical line). Herein, note that white dots in FIG. 17 represent dots printed in the first scanning operation and black dots represent dots printed in the second scanning operation.

FIG. 17 shows an example in which the aforementioned vertical-line pattern is created by using mask data for thinning. The image data, which has been thinned out by the foregoing mask pattern, causes to generate the portion where printed dots are consecutive along the column of the mask pattern (three printed dots are vertically consecutive in FIG. 17). In such portion where printed dots are consecutive, ink droplets may merge on the surface of the print medium if the ink permeating speed on the print medium is slow. Such phenomenon is called beading. Such vertical lines generated as described above are factors of image deterioration, thus being problematic.

SUMMARY OF THE INVENTION

The present invention has been made in consideration of the above situation, and has as its object to provide a print control method and apparatus, as well as a printer, for reducing image deterioration caused by printed dots that are consecutive, by decreasing the density value of image data having high density.

Another object of the present invention is to provide a print control method and apparatus, as well as a printer, for preventing printed dots that are consecutive, by removing bits from a mask pattern used for thinning out print data, to reduce image deterioration.

Another object of the present invention is to provide a print control method and apparatus, as well as a printer, for preventing printed dots that are consecutive, by changing a mask pattern in accordance with the type of ink used in the print operation, to reduce image deterioration.

Another object of the present invention is to provide a print control method and apparatus, as well as a printer, for preventing image deterioration caused by printed dots that are consecutive on a print medium, by changing a mask pattern in accordance with the type of print medium used in the print operation.

Still another object of the present invention is to provide a print control method and apparatus, as well as a printer, for preventing image deterioration caused by printed dots that are consecutive on a print medium, by changing a mask pattern in accordance with the resolution of the print data used in the print operation.

Another object of the present invention is to provide a print control method and apparatus, as well as a printer, for preventing beading and preventing the missing printable dots from being obvious by reducing the highest density value or the maximum number of printable dots to 97% to 99% of the value or the number.

By reducing the highest density value or the maximum number of printable dots to less than 99% of the value or the number, it is possible to prevent beading, and by reducing the highest density value or the maximum number of printable dots to be between 97% to 99% of the value or the number, it is possible to prevent beading without conspicuous image deterioration caused by removing printable dots.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 13A to 13C are explanatory views and graph showing an example printed by an actual printhead;

FIGS. 14A to 14C are explanatory views and graph for explaining the fine printing method;

DETAILED DESCRIPTION OF THE PREFERRED EMBODIMENTS

<First Embodiment>

Preferred embodiments of the present invention will be described in detail in accordance with the accompanying drawings. Note that although the present embodiment describes an ink-jet printer as an example the present invention is applicable to a printer adopting an other printing method. Moreover, the processing of print data according to the present embodiment does not have to be executed by the printer, but may be executed by a host computer or the like.

Figure 1:
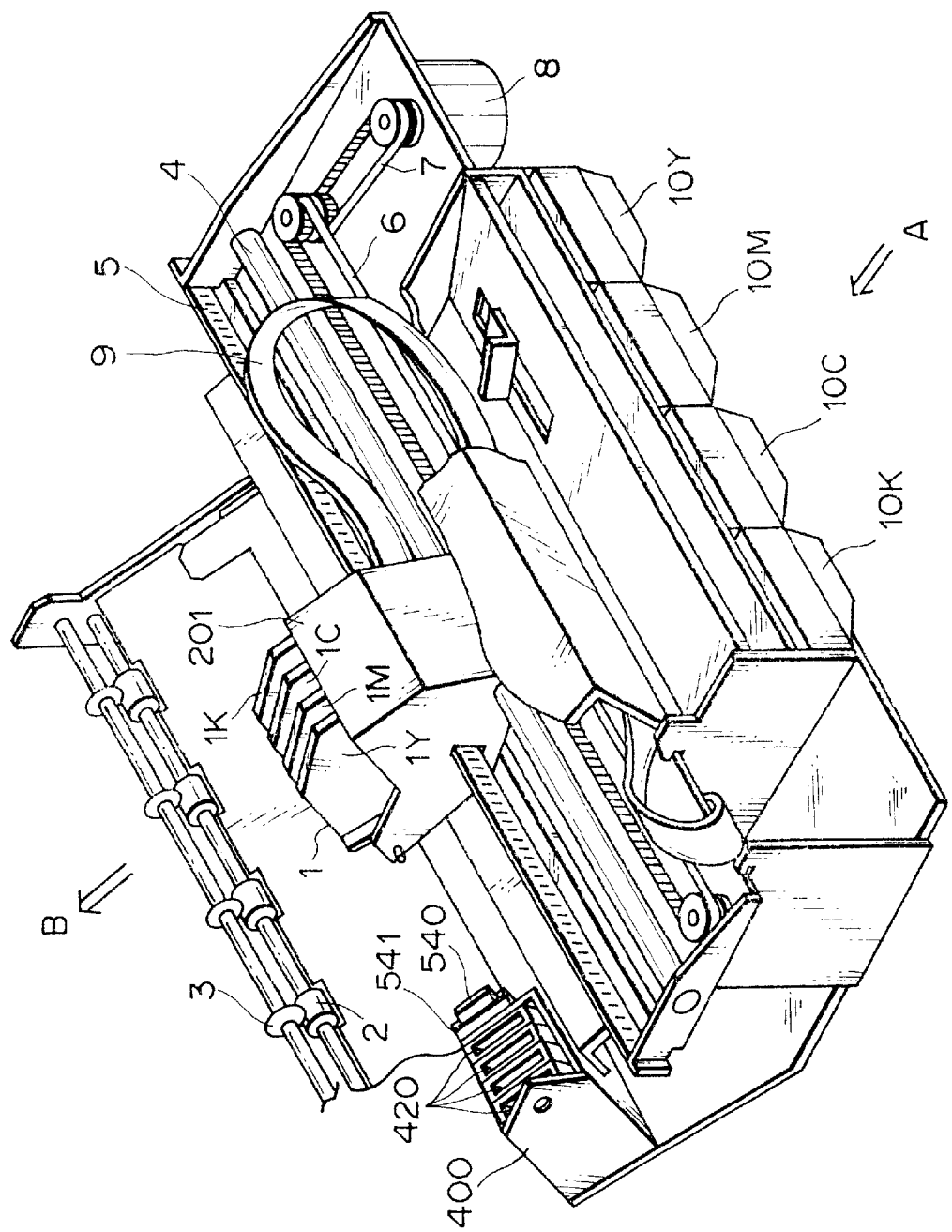
FIG. 1 is a perspective view showing a construction of a printer unit of an ink-jet printer according to the present embodiment.

FIG. 1 is a perspective view showing a construction of a printer unit of a serial-type color ink-jet printer.

In FIG. 1, a printhead (ink-jet head) assembly 1 comprises individual heads corresponding to four colors, each having a plurality of nozzles. The heads corresponding to four colors are incorporated in a carriage 201 to be conveyed in the main-scanning direction. Ink droplets are discharged by each of the heads in synchronization with scanning of the carriage 201, to form dots on a print medium, thus forming an image. To print a color image, the heads respectively discharge inks of different colors, and by virtue of the mixed colors of these inks, a color image is printed on a print medium. Print data is transmitted by electric circuits of the printer main body to the printhead assembly 1 through a cable 9. The printhead assembly 1 includes head 1K (black), head 1C (cyan), head 1M (magenta) and head 1Y (yellow) for the respective colors. At the time of scanning operation, the printhead assembly 1 is driven in accordance with the nozzle arrangement on the printhead assembly 1, and ink is discharged from the printhead assembly 1. For instance, in a case of printing a red (R) image, a magenta (M) ink droplet is first discharged on a print medium, then an yellow (Y) ink droplet is discharged onto the M-colored dot. As a result, an R-colored dot is formed. Similarly, in a case of printing a green (G) image, ink is discharged in the order of cyan (C) and yellow (Y). In a case of printing a blue (B) image, ink is discharged in the order of cyan (C) and magenta (M). Note that the heads for each of the colors are arranged with a predetermined spacing (P1).

The scanning speed and position of the carriage 201 are detected by speed detection means (including an encoding board 5 having slits and a photosensor (not shown) provided in the carriage 201). Motion control of the carriage 201 in the main-scanning direction is performed in accordance with the speed detection and position detection of the carriage 201 performed by the speed detection means. A carriage driving motor 8 serves as a power source to drive the carriage 201. Rotation of the motor 8 is transferred by a belt 7 and a belt 6 fixed to the carriage 201, and along with the motion of the belt 6, the carriage 201 is moved on a sliding shaft 4 in the main-scanning direction. Note that the print operation, performed in accordance with the motion of the carriage 201, includes one-way direction printing and both-way direction printing. Generally, in one-way direction printing, printing is performed only when the carriage 201 is moved from a home position (HP) to the other end (forward direction), and printing is not performed when the carriage 201 is returned to the HP (backward direction). Therefore, highly precise printing is possible. On the other hand, in both-way direction printing, printing is performed in both forward and backward directions. Therefore, high speed printing is possible.

Recovery unit 400 has function to maintain the printhead assembly 1 in an excellent condition all the time. In the non-printing state, cap array 420 caps the ink-discharge surface of each of the heads of the printhead assembly 1 so as to prevent ink in the nozzles from drying. For this reason, the home position (HP) is provided where the carriage 201 faces the recovery unit 400.

Next, the function of the recovery unit 400 during print operation is described.

Actual print operation is not always performed by using all nozzles of the printhead assembly 1. Moreover, even if the printhead assembly includes heads corresponding to plural colors, not all the heads are used if the corresponding color data is not transmitted. During the scanning operation of the carriage 201 (the state where the printhead assembly 1 is not capped), if ink is not discharged for a certain period of time, ink discharge performance of a nozzle may decline because of solidified or dried ink on the surface of the nozzles in the printhead, causing image quality deterioration. To prevent such situation, the printhead assembly 1 discharges ink by the nozzles at predetermined time intervals regardless of print data, in order to always maintain the optimum condition of ink surface in the nozzles. This operation is called preliminary discharge. In the preliminary discharge operation, ink is discharged in the cap array 420 in the recovery unit 400 so as not to scatter ink inside the printer or on the print medium. Then, the ink is sucked by a recovery pump (not shown) and stored in a waste ink tank (not shown). Accordingly, when a preliminary discharge operation is to be performed during a print operation, regardless of whether the print operation includes one-way direction printing or both-way direction printing, the carriage 201 must return to HP opposite to the cap array 420.

Figure 2:
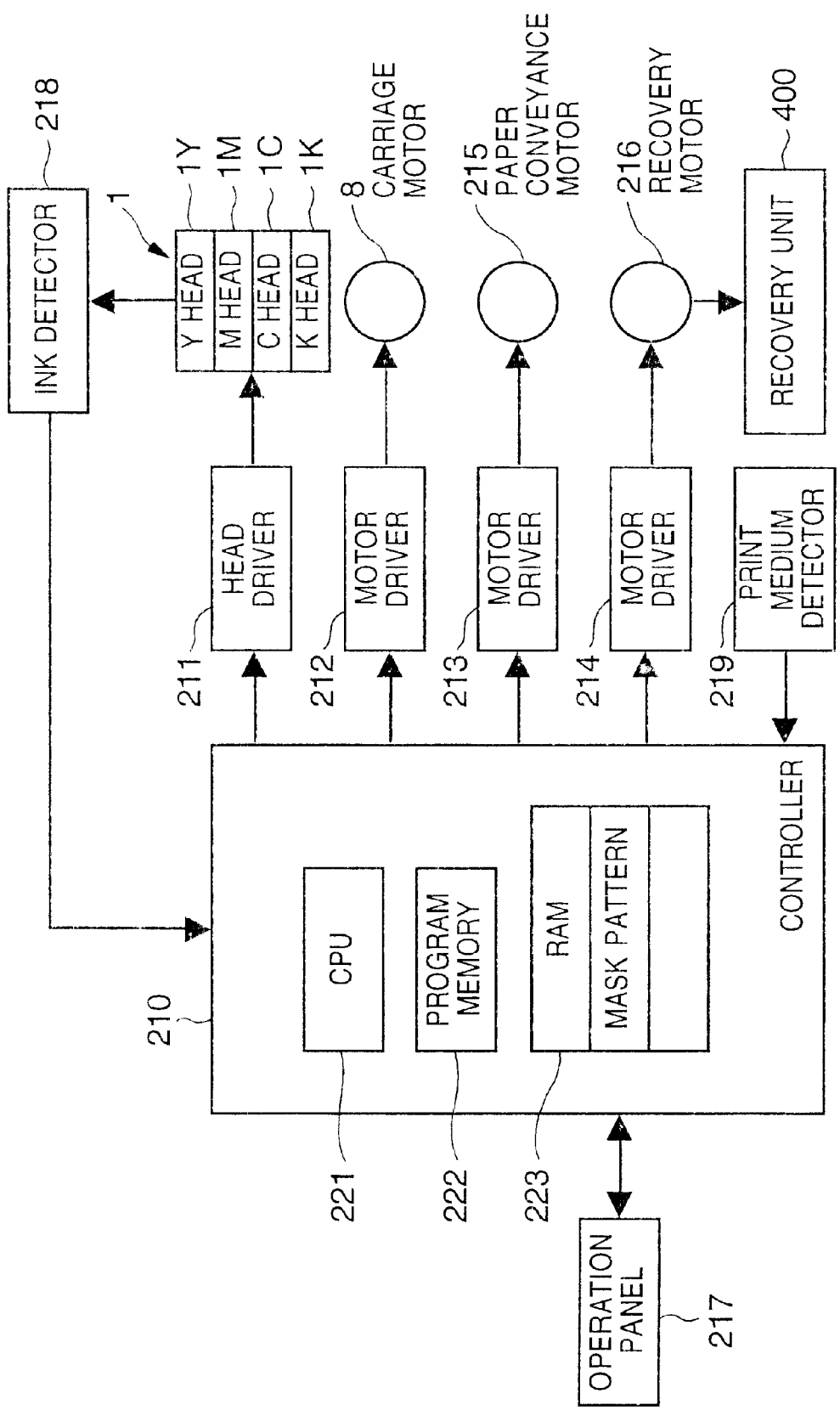
FIG. 2 is a block diagram showing a construction of the ink-jet printer according to the present embodiment.

A print medium is conveyed in the sub-scanning direction by a paper conveyance member (rubber roller or the like) driven by a paper conveyance motor 215 (FIG. 2). The print medium enters from the direction indicated by arrow A, and when the print medium reaches the print position, a print operation is performed thereon by the printhead assembly 1. Then, the print medium is discharged by paper discharge mechanisms 2 and 3 to the direction indicated by arrow B. Each color ink is supplied to the printhead assembly 1 from ink cartridges 10K, 10C, 10M and 10Y, respectively.

FIG. 2 is a block diagram showing a construction of the ink-jet printer according to the present embodiment. Components that are common to the above-described drawing are referred to by the same reference numerals and description thereof will be omitted.

Referring to FIG. 2, reference numeral 210 denotes a controller for controlling operation of the entire printer. The controller 210 includes a CPU 221 such as a microprocessor or the like, a program memory 222 where control programs executed by the CPU 221 are stored, and a RAM 223 for temporarily storing various data used when the CPU 221 executes various processings. Reference numeral 211 denotes a head driver which drives the printhead 1 under the control of controller 210; and 212 to 214, motor drivers which respectively drive corresponding motors based on an instruction by the controller 210. Reference numeral 215 denotes a paper conveyance motor for conveying a print medium (print paper, resin sheet and so on); and 216, a recovery motor for driving the recovery unit 400. An operation panel 217, including a display unit such as a liquid crystal display or the like and various keys and so forth, is used by an operator for inputting various data. For instance, the type of ink or the type of print medium to be used for printing may be instructed through the operation panel 217. Reference numeral 218 denotes an ink detector which detects the type of ink used by the printhead assembly 1; and 219, a print medium detector which detects the type of print medium used in printing. Note that an operator may input various data from a device other than the printer main body, e.g., from a host computer or the like.

Figure 3:
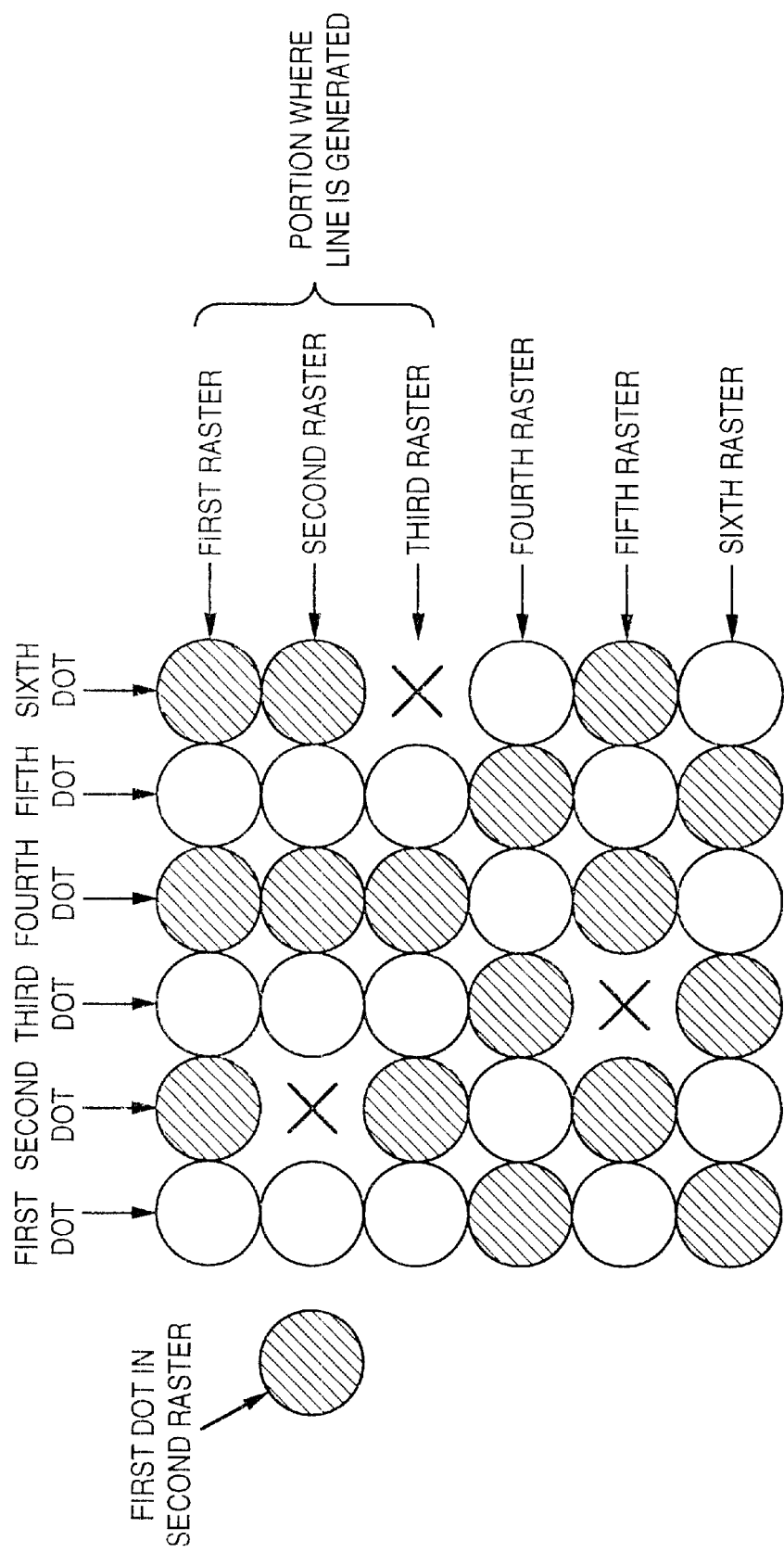
FIG. 3 is an explanatory view of the printed dot arrangement according to the first embodiment.

FIG. 3 is an explanatory view of forming dots according to the present embodiment.

Figure 17:
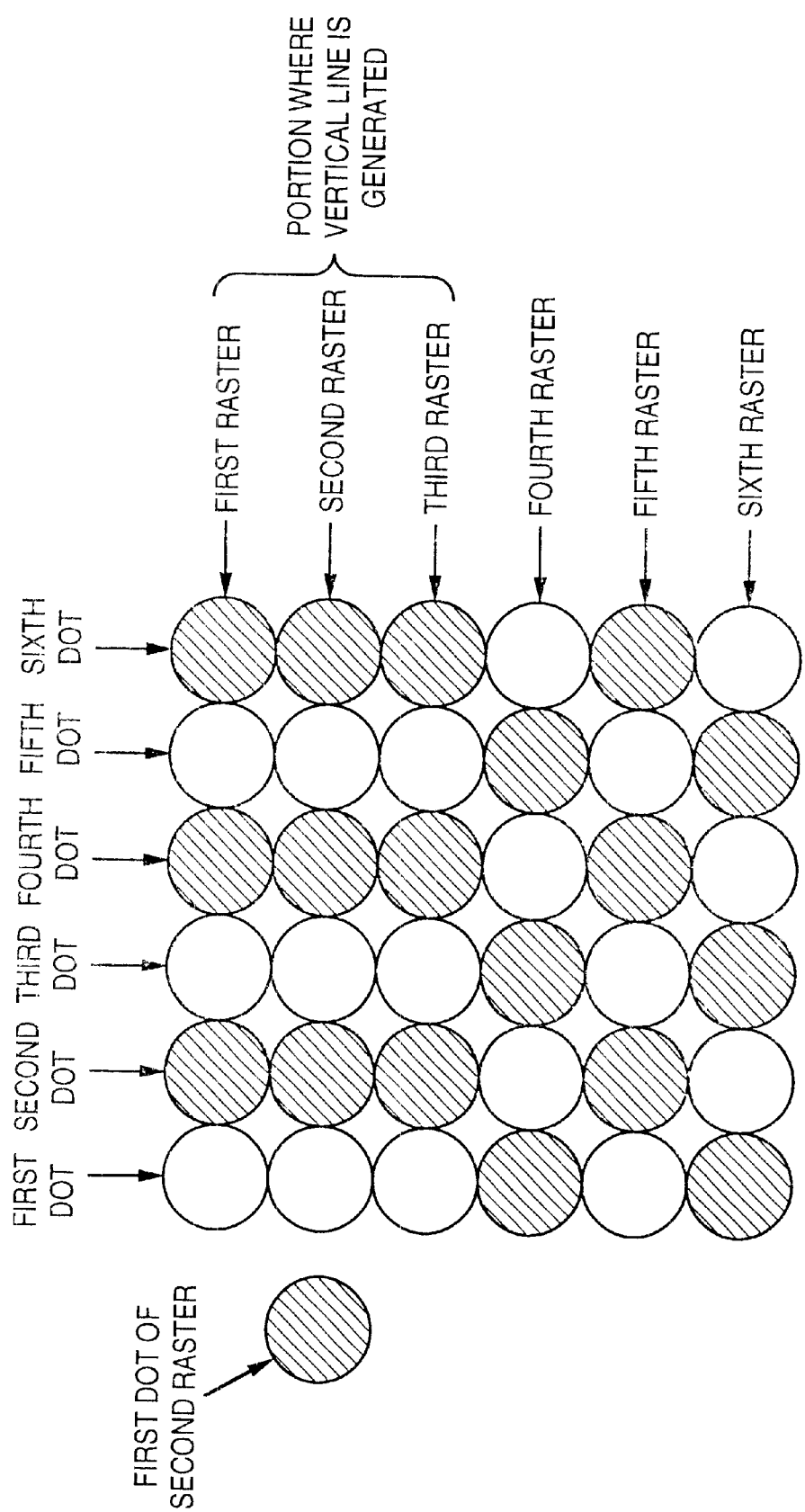
FIG. 17 is an explanatory view showing the state where beading is generated.

FIG. 3 illustrates an example where dots are removed from the image such that the vertical-consecutive dots shown in FIG. 17, which cause beading, are divided so as not to create consecutive dots. The mark "X" in FIG. 3 indicates the portion where a dot is removed. As described above, by removing dots and eliminating the portion where dots are consecutive, it is possible to reduce a line generated by beading and obtain an image with better quality.

Hereinafter, the processing of removing a dot is described.

Figure 4:
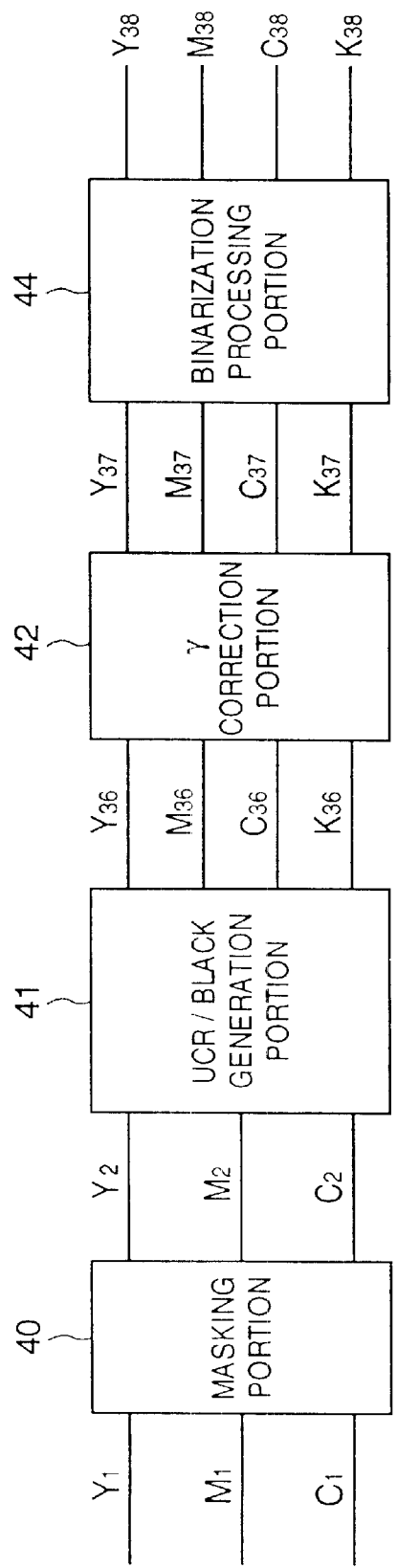
FIG. 4 is a block diagram showing image signal processing performed by the ink-jet printer according to the present embodiment.

FIG. 4 is a block diagram showing a configuration of functions in general image signal processing performed by the above-described ink-jet printer. Note that a part or all of the processing shown in FIG. 4 may be performed by the ink-jet printer according to the present embodiment, or may be performed by the host computer and the processed data may be sent to the ink-jet printer. Although either case is possible in the present embodiment, herein, description will be provided on performing the processing within the printer.

Original image signals for R, G and B obtained by reading an original image by a scanner, or by the processing of a computer, or by reading from a memory medium, are converted to density signals Y1, M1 and C1, respectively corresponding to yellow, magenta and cyan, by color conversion processing. These density signals are subjected to color correction by a masking portion 40. Then, under color removal operation is performed by an under color removal (UCR)/black generation portion 41 to generate new image signals Y36, M36, C36 and K36 respectively corresponding to yellow, magenta, cyan and black. Next, in a gamma (γ) correction portion 42, gamma correction is performed using a gamma correction table shown in FIG. 5B. Image density signals Y37, M37, C37 and K37 which have been γ-corrected are inputted to a binarization processing portion 44 where binarization processing is performed on each of the signals and image signals Y38, M38, C38 and K38 are generated to be transferred to the printheads 1Y, 1M, 1C and 1K. Note that an example of binarization method used by the binarization processing portion 44 is a dither method or an error diffusion method. According to the dither method, binarization is performed by using a predetermined dither pattern where different threshold values are set for each of the density signals of pixels. Note that although the present embodiment explains that the number of dots is reduced only when density is at the highest value, the present invention is not limited to this case. Even in a case of the density data being close to the highest density value, it is possible to control such that the number of dots to be printed is reduced.

According to the present embodiment, the above-described dot-removal processing may be performed by the γ correction portion 42 in FIG. 4.

Figure 5A:
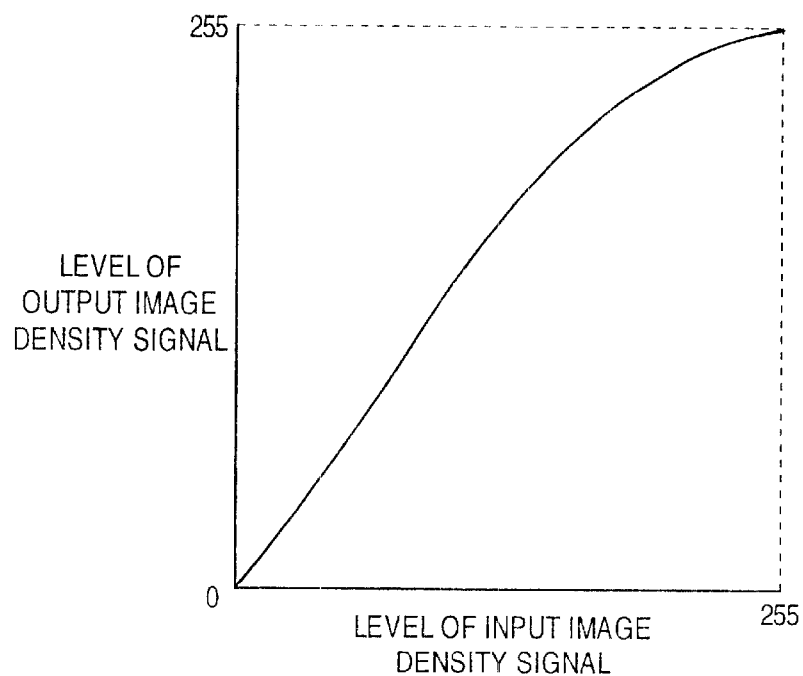
FIGS. 5A and 5B are graphs for explaining a gamma correction table according to the present embodiment.
Figure 5B:
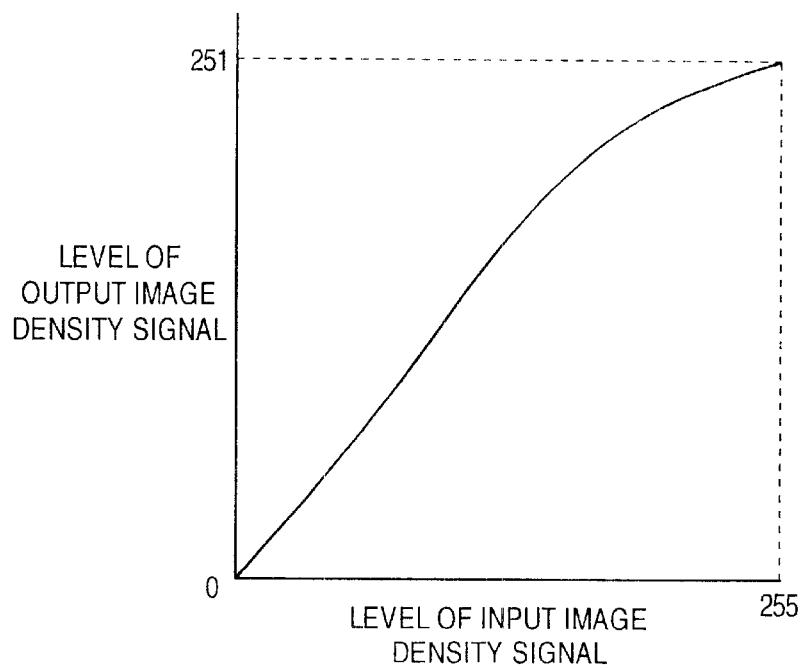

FIGS. 5A and 5B are graphs for explaining how the level of output image density signal is determined in correspondence with the level of input image density signal (abscissa).

In FIG. 5A, the maximum output level of image density signal is set to "255" while the range of input data is "255." When data having highest density "255" is inputted, the output value will be the highest value "255." If an image is printed at the highest value "255," all dots are printed as shown in FIG. 17. In other words, beading occurs as described above with reference to FIG. 17.

To cope with this situation, as shown in FIG. 5B, the output level is set such that inputted data, having a highest value "255", is outputted at a lower density value. Accordingly, a solid image is not generated even at the highest density. In the present embodiment, a set value "251" is adopted in place of the highest value of the output level "255." The set value "251" is a value reduced by about 2% of the highest output level "255." If the set value is too small, too many dots are removed. As a result, the level of highest density will decline, or the removed dots will become visible in a thin line or a slant line of an image. On the other hand, if the set value is too large, sufficient effects of dot removal cannot be attained, and the dot removal cannot function as a countermeasure against beading mentioned above.

The set value varies depending on resolution printed by the printer, ink type, printing method (single/multiple scan), type of print medium (ink absorption characteristic and so forth) and the like. Therefore, it is necessary to select a set value which is most suitable to each system. The above-described set value, reduced by about 2% of the highest density, is merely an example. Upon determining a density level of the output image by the γ correction portion 42, the image density signals are converted to print data by the binarization processing portion 44 based on the determined value of the density level.

Figure 6:
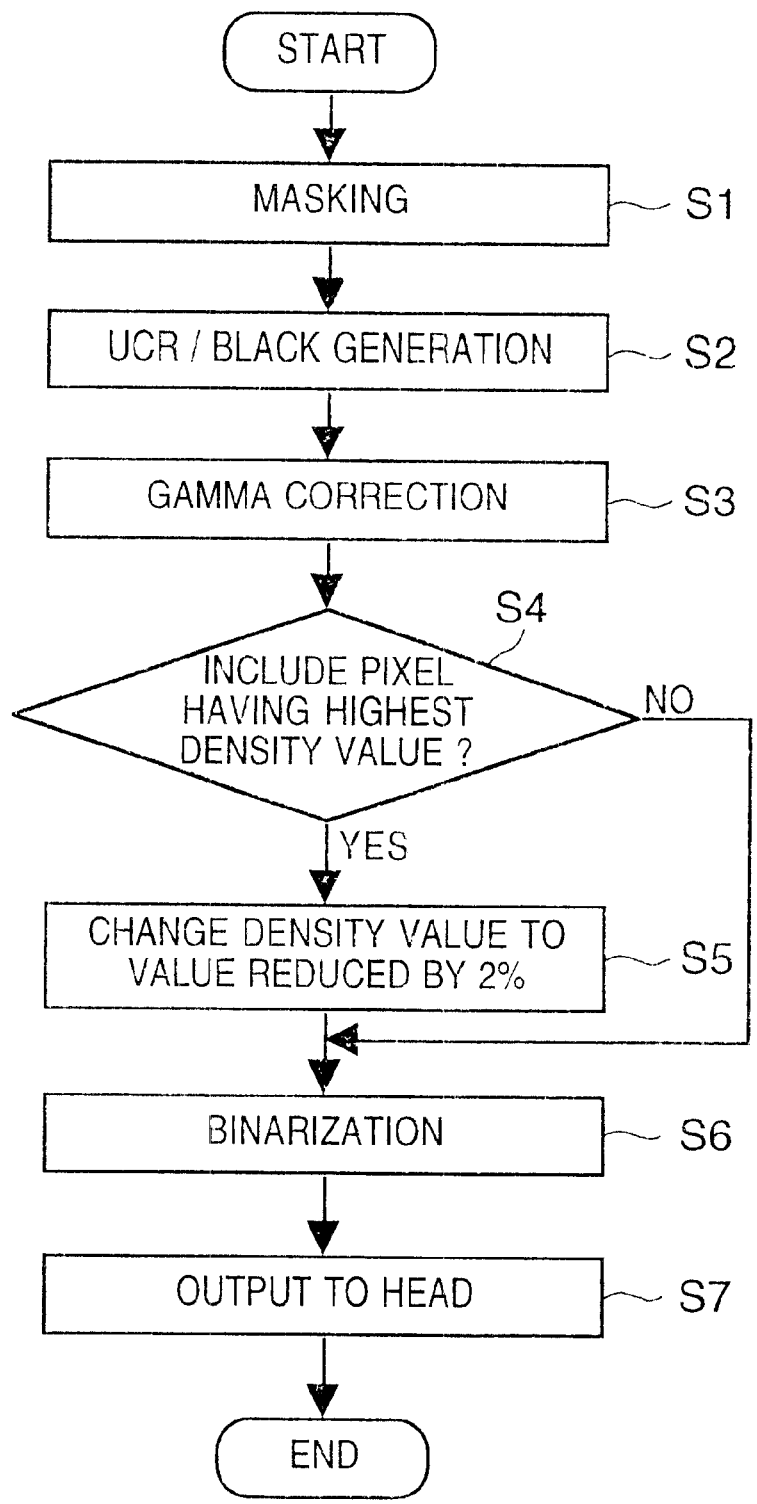
FIG. 6 is a flowchart explaining processing executed by the ink-jet printer according to the first embodiment.

FIG. 6 is a flowchart describing image processing executed by the controller 210 of the ink-jet printer according to the present embodiment. The control program executing the processing is stored in the program memory 222.

First in step S1, masking processing is executed on the density signals inputted by a host or the like. In step S2, under color removal (UCR)/black generation processing is performed. Next in step S3, gamma (γ) correction is performed while it is determined in step S4 whether or not the inputted density signals include pixel data having the highest density value. If such pixel data is found, the processing proceeds to step S5 where the highest density value is changed to a value reduced by 2% from the highest density value. The image data which has been gamma-corrected in the foregoing manner is subjected to binarization processing in step S6 and outputted to the printhead 1 via the head driver 211. Note that the set value adopted by the present embodiment, which is reduced by 2% from the highest density value, may vary depending on various conditions, e.g., the printing resolution, ink type, printing method, type of print medium and so forth. Taking into consideration the objective to minimize beading and the aspect that removed dots are not conspicuous, it is preferable to decrease a number of dots such that dots are printed within the range of 97% to 99% of the entire printable dots. By selecting an appropriate number of dots within this range based on the aforementioned various conditions, an image having better quality can be attained.

<Second Embodiment>

In the second embodiment, the above-described dot removal is performed by using a mask pattern. Assume a case of using a mask pattern having an 8×8 mask (64 tones) to reduce density by 2% from the above-described highest density. If one pixel is to be removed from 64 pixels, the reduction rate is 1/64=1.6 (%). Therefore, removing one pixel (bit) from the 8×8 mask pattern achieves the same effect.

Figure 7:
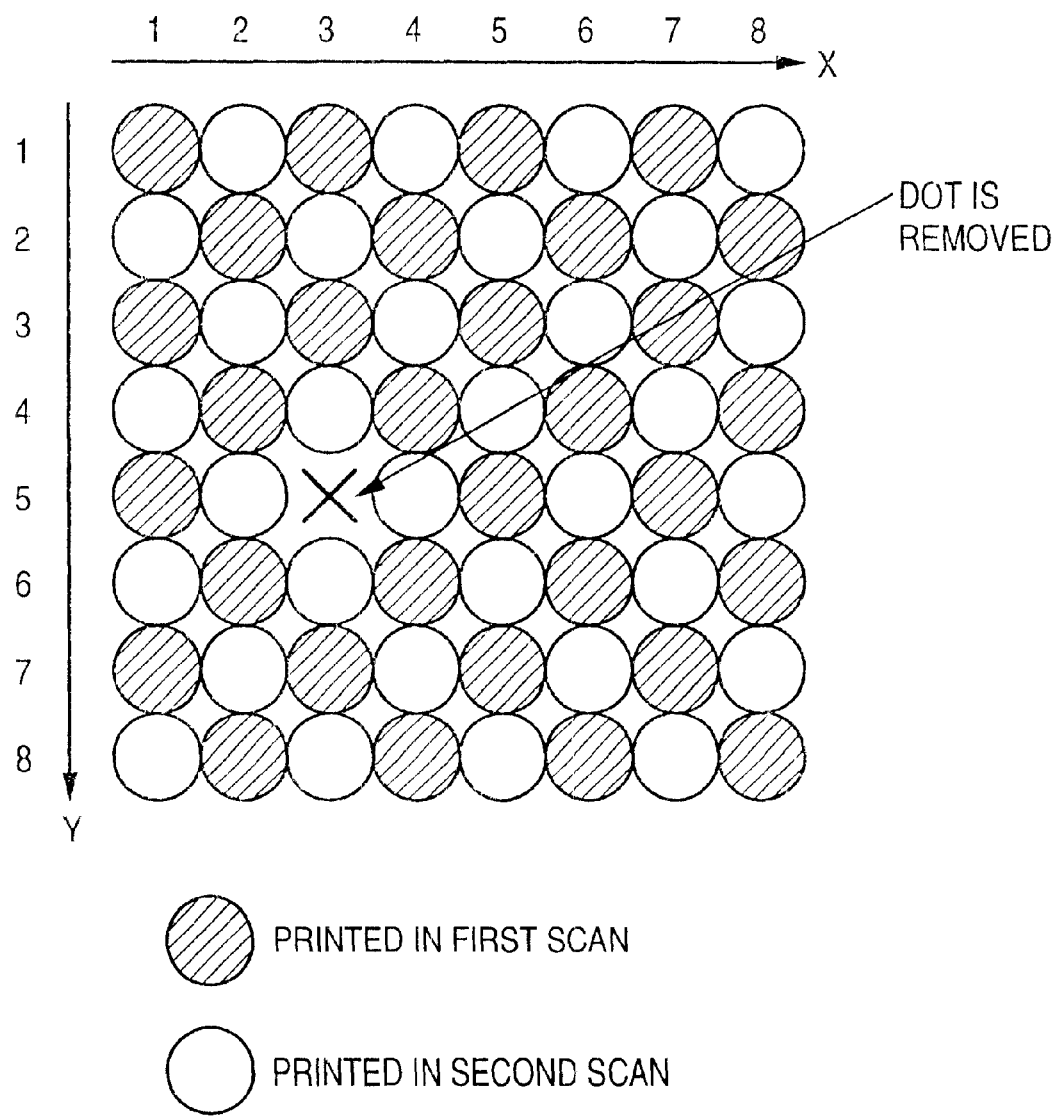
FIG. 7 is an explanatory view showing dot arrangement in a mask pattern according to the second embodiment of the present invention.

FIG. 7 is an explanatory view illustrating a case of removing a dot positioned in the third place in the X direction (third column) and the fifth place in the Y direction (fifth row), from the 8×8 mask pattern (the removed dot is indicated by "X"). The pattern in FIG. 7 is printed by using the checker mask pattern and reverse checker mask pattern used in the foregoing description of the conventional example. The portion indicated by "X", where a dot is removed, corresponds to a position of a dot which would have been indicated by a black circle which is supposed to be printed by the first scanning operation.

However, even if the 8×8 mask pattern is used, if a bit (dot) of the same position (fifth column and third row) is always removed, its recurrent appearance is conspicuous. Therefore, upon masking the adjacent 8×8 mask patterns, positions are changed so that dots in different positions are removed (e.g., a dot positioned at the sixth place in the X direction and the third place in the Y direction).

Figure 8:
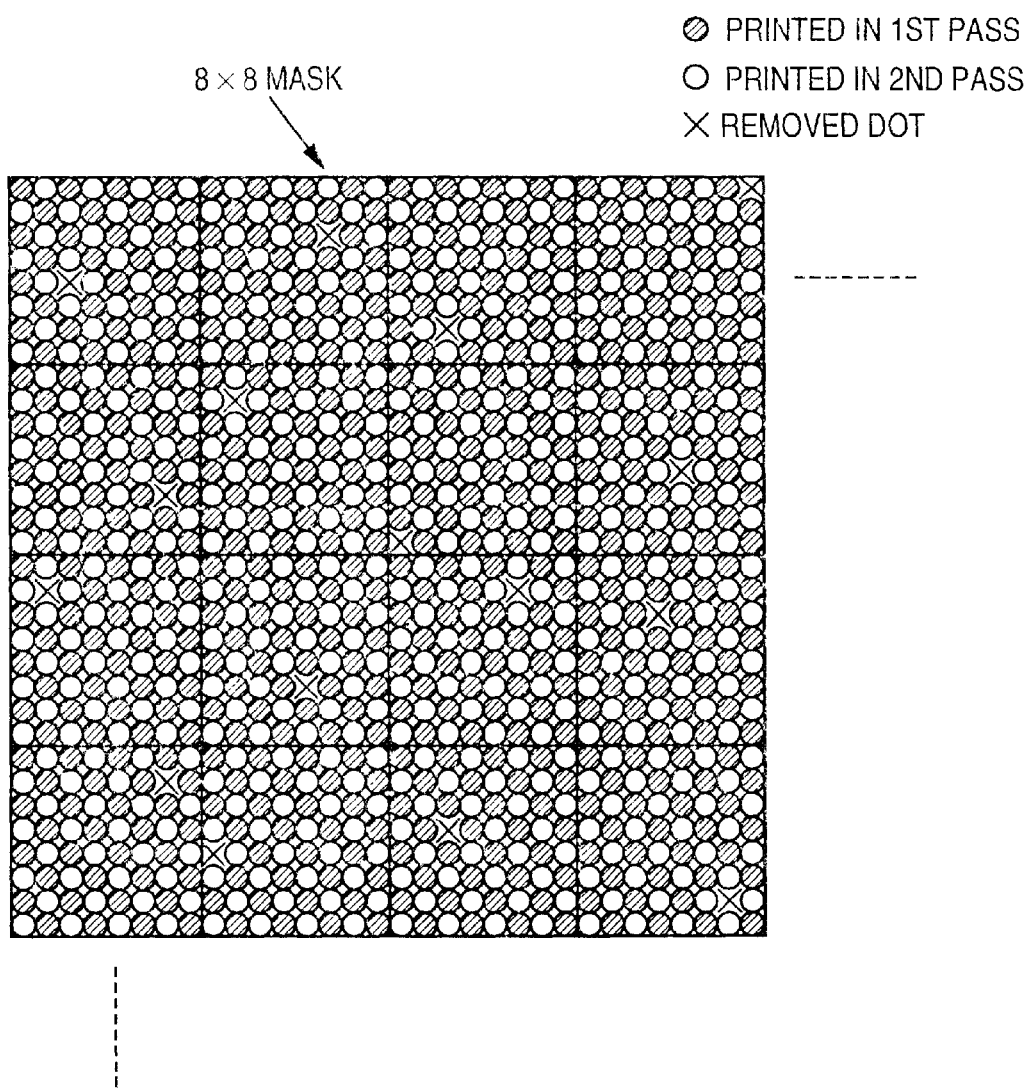
FIG. 8 is an explanatory view showing an example where the positions of dots to be removed are altered between adjacent mask patterns, according to the second embodiment.

FIG. 8 shows an example where the positions of dots to be removed are altered between the adjacent 8×8 mask patterns. The portions indicated by "X" are the removed dot positions.

In FIG. 8, four 8×8 mask patterns are arranged in the horizontal and vertical directions. The entire pattern may be used as a 32×32 mask pattern. The size of the mask pattern is different depending on the resolution of print data or a dot diameter. In short, even if a dot of the same position is repeatedly removed, it is acceptable as long as the printed image does not show a recurrent pattern or texture that is conspicuously visible. In other words, the size of the mask pattern and the positions where dots are to be removed are determined so as not to generate a recurrent pattern or texture that is conspicuously visible.

Although the foregoing description has been given on the checker and reverse checker mask patterns as an example, it is applicable to other mask patterns. For instance, pixel data may be divided into groups such as the aforementioned 8×8 mask pattern, and dots may be removed by determining a reduction rate for the highest density in this group. Furthermore, a recurrent pattern or texture generated in the entire image can be reduced similarly by removing dots at different positions in the adjacent groups.

Figure 9:
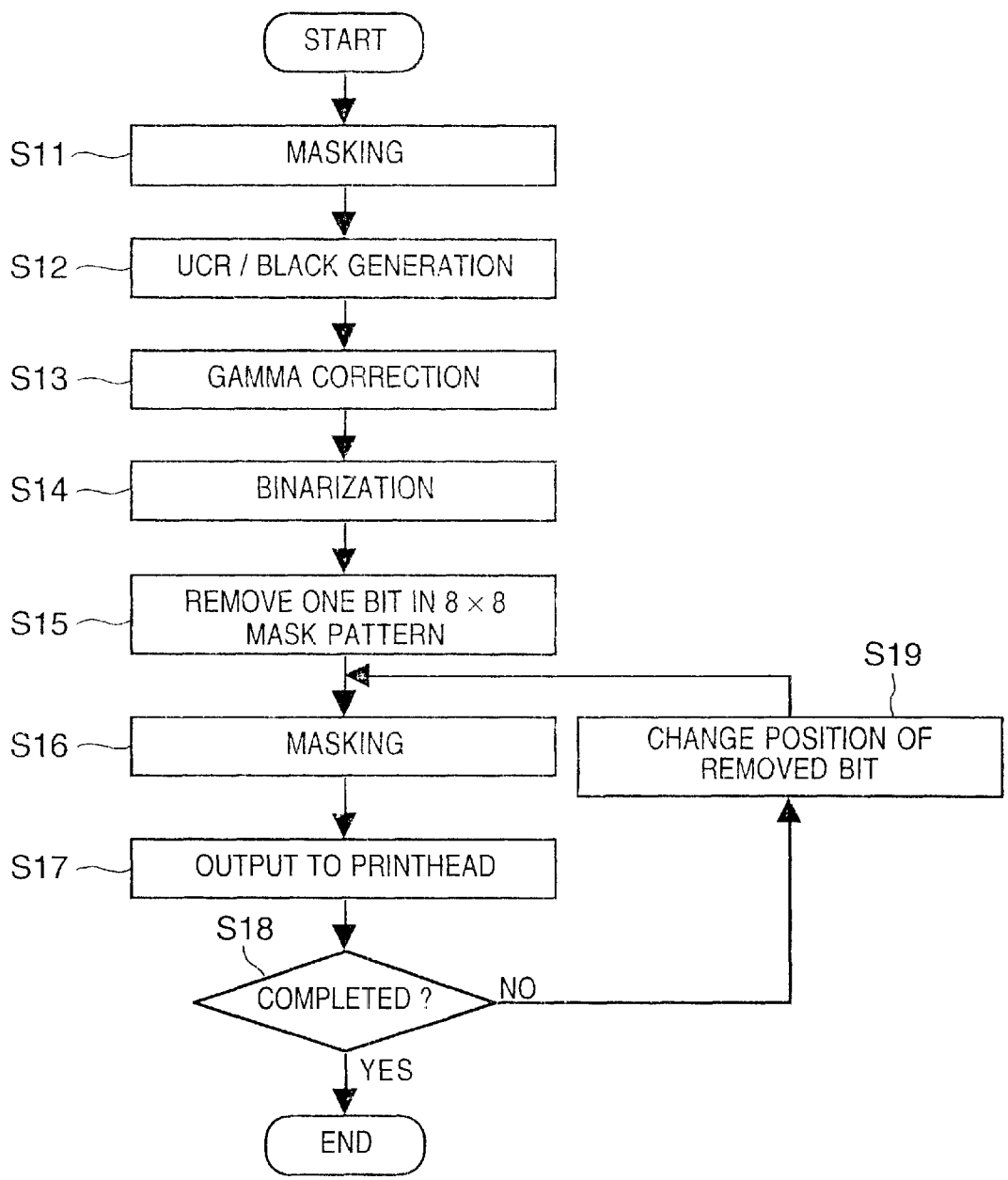
FIG. 9 is a flowchart showing processing performed by an ink-jet printer according to the second embodiment.

FIG. 9 is a flowchart showing the processing performed by the ink-jet printer according to the second embodiment.

The processing in steps S11–S13 (the γ correction is performed based on the characteristic shown in FIG. 5A) is the same as that of steps S1–S3 in FIG. 6. Thus, description will not be given herein. In Step S14, the data on which gamma correction has been performed is binarized. By this, binary data to be printed in single scan of the printhead is generated. In the subsequent step S15, one bit is removed (to be "0") in the 8×8 mask pattern. In step S16, masking processing is performed on the binarized data, using the mask pattern from which one bit has been removed. Then, the result thereof is outputted to the printhead assembly 1. In step S18, it is determined whether or not the entire data has been outputted to the printhead assembly 1. If the entire data has not been outputted, the processing proceeds to step S19 where the bit position to be removed in the 8×8 mask pattern is randomly changed and masking is performed using that mask pattern in step S16. By performing the foregoing processing on the entire data, data on which masking has been performed, e.g., as shown in FIG. 8, can be obtained.

As set forth above, according to the second embodiment, since dots are removed by using a mask pattern, the aforementioned gamma correction table does not need to contain two types of tables, for the cases of removing dots and not removing dots.

<Third Embodiment>

In the third embodiment, the operation of dot removal, described in the second embodiment, is performed in accordance with the type of ink (print material) used in the printing operation.

The ink-jet printer according to the third embodiment comprises the printhead assembly 1 having heads 1K (black), 1C (cyan), 1M (magenta) and 1Y (yellow) for each of the ink colors, and having ink tanks containing respective colors of ink. Herein, since Bk (black) ink has higher density than that of C, M and Y ink, and is dark in appearance, lines caused by aforementioned beading or consecutive dots are less conspicuous. On the other hand, if a dot having high density and a dark color is removed, the color of print medium (normally, white) may show. Meanwhile, since C and M inks have a lighter color appearance than Bk ink, lines caused by beading become conspicuous (Y ink is too bright to be conspicuous). On the other hand, even if dots having these brighter colors are removed, portions of the print medium, on which the dots are removed, do not appear conspicuously.

In view of the above, in the third embodiment, the aforementioned operation of bit removal is not performed on a mask pattern for Bk ink, but is performed on a mask pattern for C, M and Y inks. Note that not only the color of ink used, but also the composition of ink influences the way the printed dots are merged (beading) on a print medium. Therefore, it is also an effective measure against the aforementioned beading, to decide whether or not the operation of dot removal is to be performed in accordance with the composition of ink.

Figure 10:
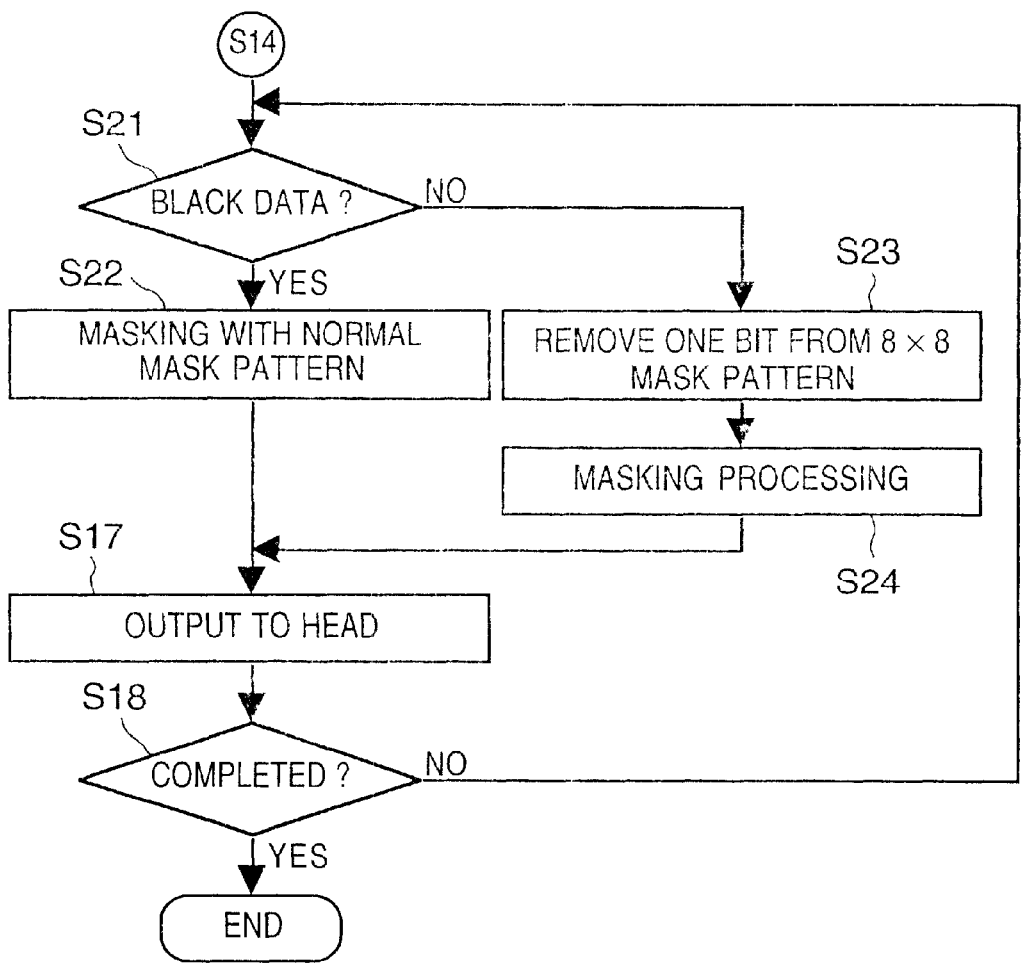
FIG. 10 is a flowchart showing processing performed by an ink-jet printer according to the third embodiment.

FIG. 10 is a flowchart showing masking processing performed in the third embodiment, and is shown in the combined form with the flowchart in FIG. 9.

Following the processing in step S14 in FIG. 9, the processing proceeds to step S21 where determination is made as to whether or not the data subjected to processing is black data. If so, the processing proceeds to step S22 where masking is performed on the print data (binary) with the normal 8×8 mask pattern (dots are not removed). Meanwhile, if it is determined that the print data is not black data in step S21 (cyan, magenta or yellow), the processing proceeds to step S23 where one bit is removed (to be "0") in the 8×8 mask pattern (dot-removal position is randomly decided). Then, the processing proceeds to step S24 where masking is performed on the print data using the mask pattern from which one bit has been removed. The data on which masking has been performed in step S22 or step S24 is outputted to the ink-jet heads of the printhead 1, corresponding to respective colors, to be printed. In the foregoing manner, the above-described processing is repeated until it is determined in step S18 that all print data has been outputted to the printhead 1.

Note that the type of ink and colors of ink used in printing can be readily determined by print data from a host computer. With regard to the composition of ink used in printing, the type of ink used by the printhead assembly 1 may be identified by the aforementioned ink detector 218 based on an identification code provided to the ink tank, and the composition, viscosity, density of ink and so forth may be determined based on the identified type of ink. Such method of identifying a code on the ink tank is well known. Thus, description thereof will not be provided herein.

<Fourth Embodiment>

In the fourth embodiment, the operation of dot removal described in the foregoing embodiments is performed in accordance with the type of print medium.

In a case of printing on a paper having no coating layer, which serves as an ink receiving layer on the surface of the print medium, i.e., regular paper, the above-described beading phenomenon does not occur. Therefore, upon printing an image on a regular paper, the operation of dot removal need not be performed. On the other hand, in a case of a print medium where the ink receiving layer is coated on a resin film, such as that exemplified by an OHP sheet, the ink permeating speed is slow and beading easily occurs. Therefore, when using a print medium of this type, the above-described operation of dot removal is performed to prevent image deterioration due to beading.

Further, the rate of dot removal may be changed in accordance with the type of print medium. More specifically, the rate of dot removal is set relatively high for printing on a print medium such as resin film or the like so as to effectively prevent beading, while the rate is set relatively low for printing on a print medium such as regular print paper or the like so as to attain the above effects.

This processing is now described with reference to the flowchart shown in FIG. 11.

Figure 11:
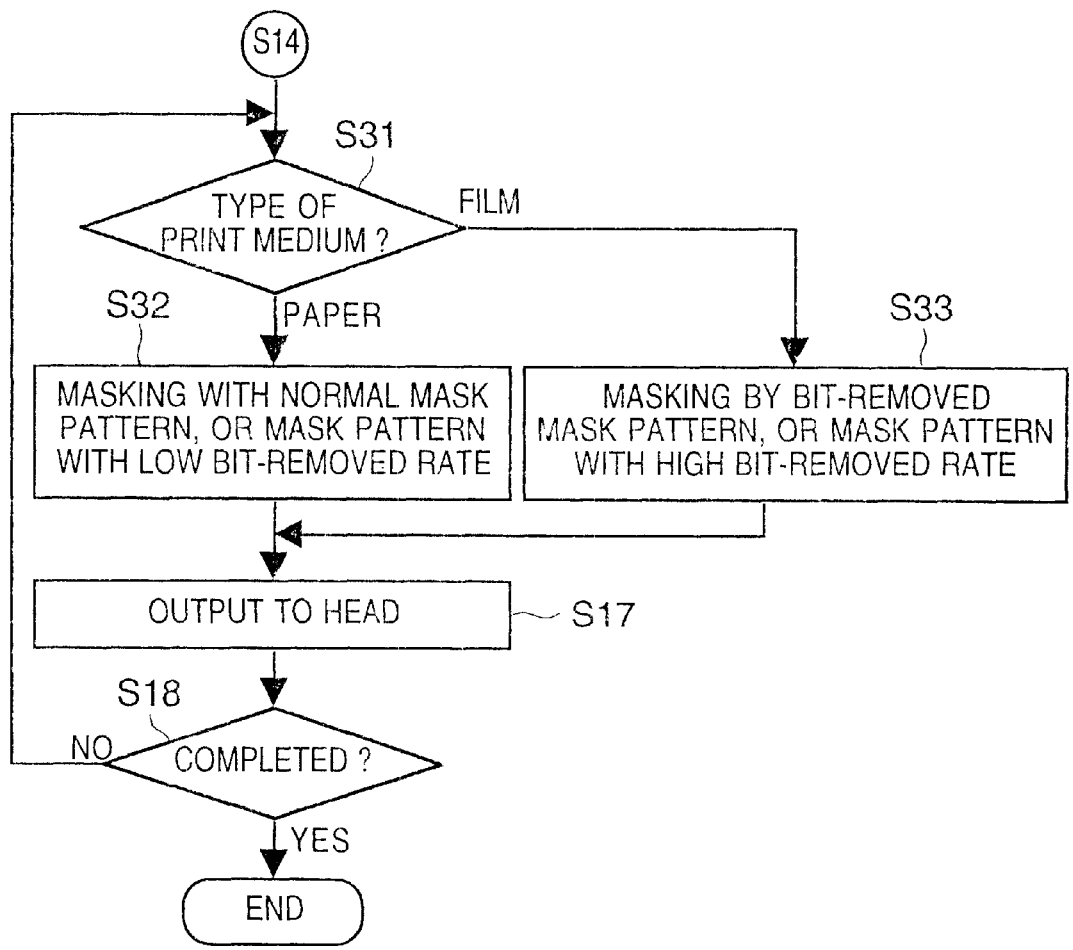
FIG. 11 is a flowchart showing processing performed by an ink-jet printer according to the fourth embodiment.
Figure 12C:
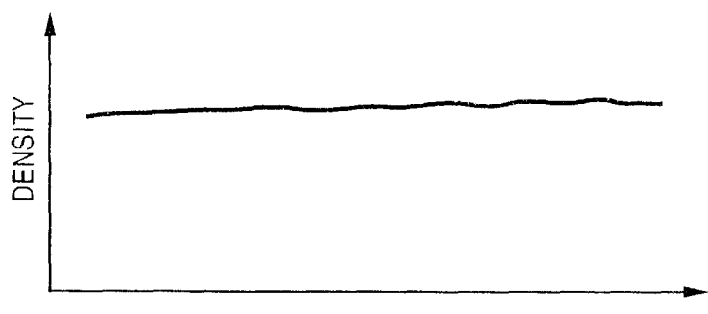
FIGS. 12A to 12C are explanatory views and graph showing an example printed by an ideal ink-jet head.
Figure 12B:
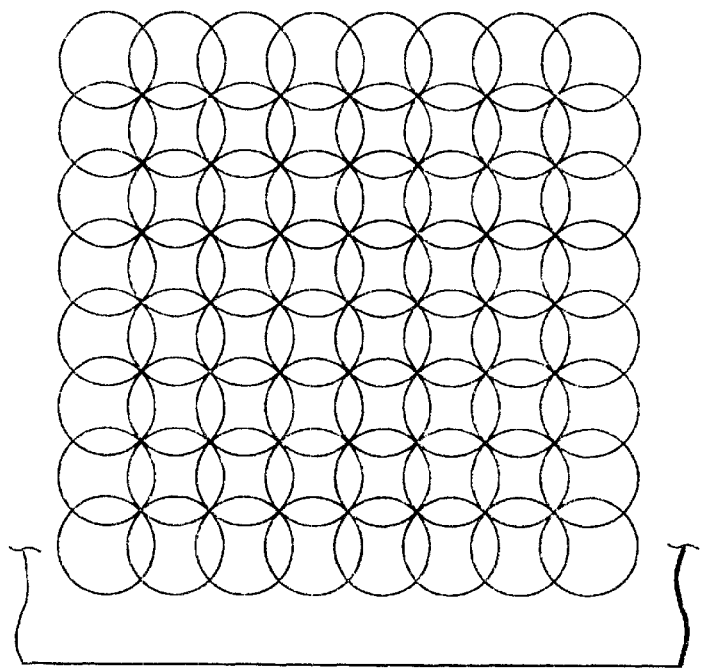
Figure 12A:
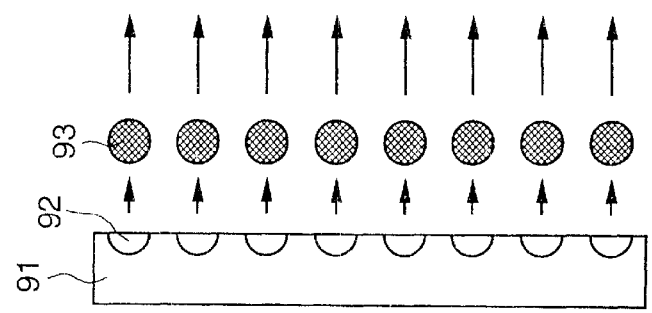
Figure 15A:
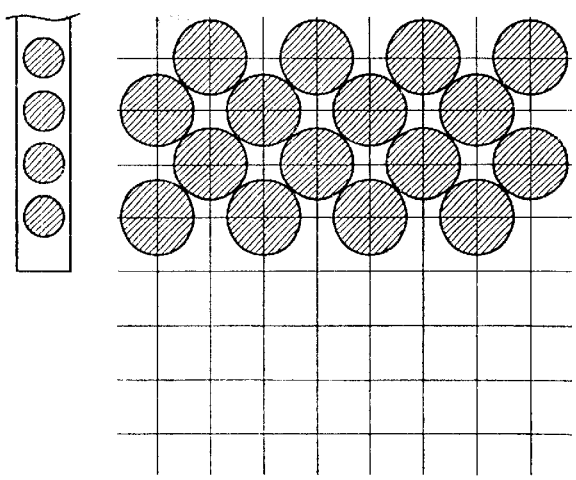
FIGS. 15A to 15C are explanatory views showing a printed example using a checker mask pattern and a reverse checker mask pattern.
Figure 15B:
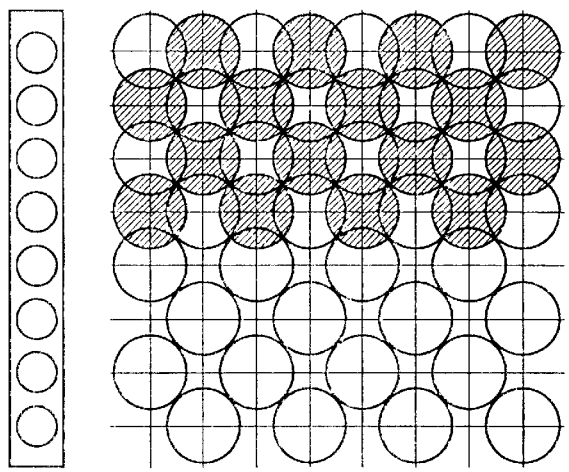
Figure 15C:
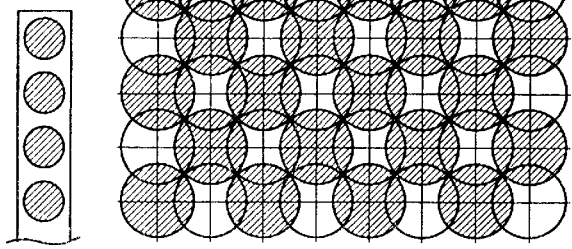
Figure 16:
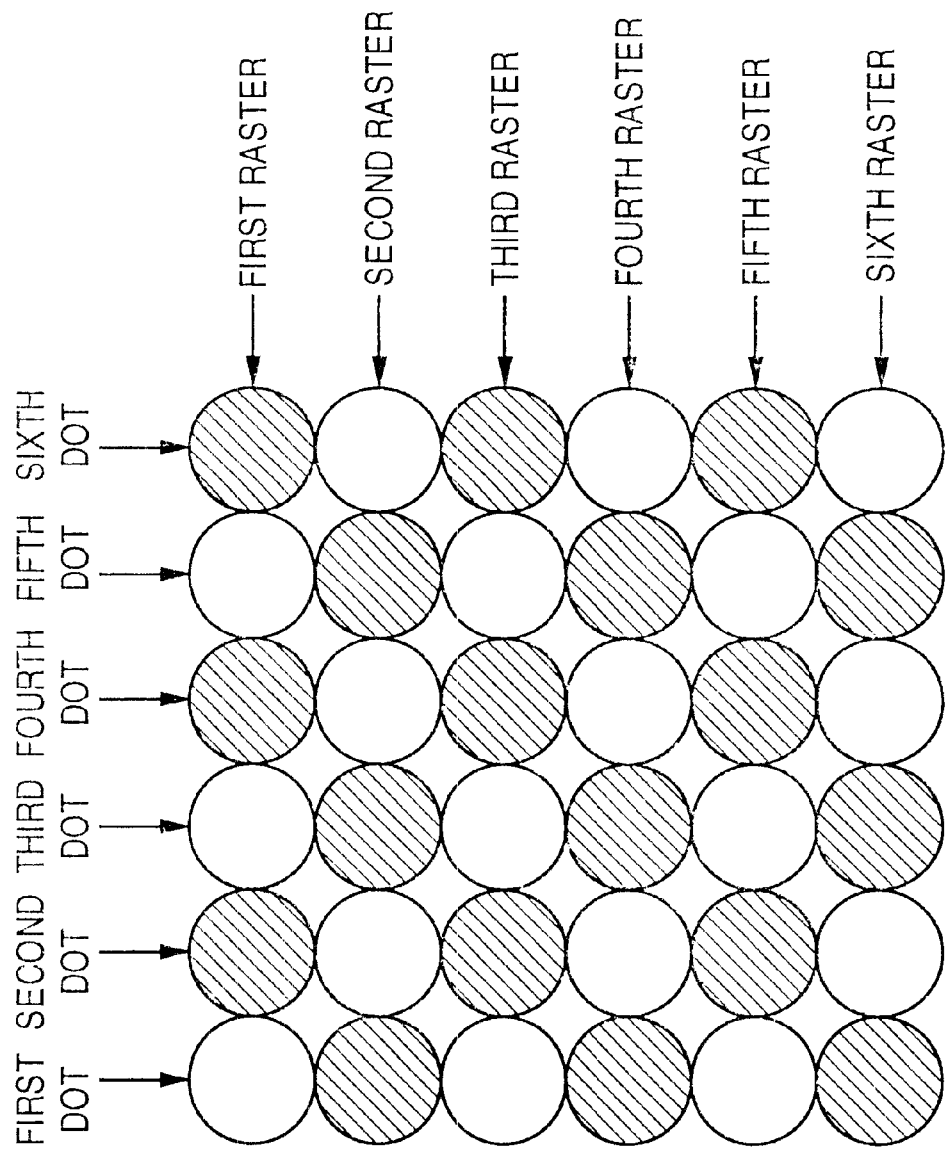
FIG. 16 is an explanatory view of an example printed by using a mask pattern, adopting a checker mask pattern and reverse checker mask pattern.

Referring to FIG. 11, in step S31, the type of print medium used in the print operation is determined by the aforementioned print medium detector 219. In a case where the detected print medium is regular print paper or the like, the processing proceeds to step S32 where dot data is removed from the print data by using a normal mask pattern where the above-described bit removal has not been performed, or a mask pattern having a low rate of bit removal. In a case where the print medium detected in step S31 is a resin film or the like, the processing proceeds to step S33 where dot data is removed from the print data by using a mask pattern where the above-described bit removal has been performed, or a mask pattern having a high rate of bit removal. Then, the processing proceeds to step S17 where the masked print data is outputted to the printhead assembly 1 and printed. The processing in steps S31-S18 is repeated until it is determined in step S18 that all print data has been outputted to the printhead 1. Note that the type of print medium may be instructed by the operation panel 217 of the ink-jet printer, or by a host computer or the like. Alternately, light reflected by or transmitted through the surface of the print medium may be detected by an optical sensor or the like to directly identify the type of print medium.

Further, the rate of dot removal may be changed in accordance with the resolution of print data. More specifically, in a case of printing data having low resolution, the size of dot is larger compared to a case of printing data having high resolution. Therefore, if the dot removal rate, used at the time of printing high-resolution print data, is applied to the case of printing low-resolution print data, the removed dot positions become conspicuous. Therefore, when printing is performed at low resolution (e.g., 300 dpi), it is preferable to set the dot removal rate smaller than that of printing at high resolution (e.g., 600 dpi). Note that the printing at low resolution includes a case where dots with high resolution are collectively printed so as to reproduce a tone of an image. For example, assuming a case of printing at 300 dpi, dots having 600 dpi are printed by using a 2×2 matrix, as one dot having 300 dpi.

Note that the above case can be readily realized by determining the resolution of data to be used for printing in step S31 in FIG. 11. If the printing is performed at high resolution, the processing proceeds to step S33, otherwise, the processing proceeds to step S32. Therefore, description thereof will be omitted.

Moreover, in the foregoing second to fourth embodiments, the mask pattern is changed in accordance with the type of ink or type of print medium. However, the present invention is not limited to this. For instance, by combining the first embodiment with any one of the second to fourth embodiments, the density value of pixel data having a high density value may be decreased by several percentages in accordance with the type of ink or type of print medium used in print operation, then binarization may be performed.

Each of the embodiments described above has exemplified a printer, which comprises means (e.g., an electrothermal transducer, laser beam generator, and the like) for generating heat energy as energy utilized upon execution of ink discharge, and causes a change in state of ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse-form driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, an exchangeable chip type printhead, which can be electrically connected to the apparatus main unit and can receive ink from the apparatus main unit upon being mounted on the apparatus main unit, or a cartridge type printhead in which an ink tank is integrally arranged on the printhead itself, is applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Moreover, in each of the above-mentioned embodiments of the present invention, it is assumed that the ink is a liquid. Alternatively, the present invention may employ ink which is solid at room temperature or less, or ink which softens or liquefies at room temperature, or ink which liquefies upon application of a printing signal, since it is a general practice to perform temperature control of the ink itself within a range from 30° C. to 70° C. in the ink-jet system, so that the ink viscosity can fall within a stable discharge range.

In addition, in order to prevent the temperature rise caused by heat energy by positively utilizing it as energy for causing a change in state of the ink from a solid state to a liquid state, or to prevent evaporation of the ink, ink which is solid in a non-use state and liquefies upon heating may be used. In any case, ink which liquefies upon application of heat energy according to a printing signal and is discharged in a liquid state, ink which begins to solidify when it reaches a printing medium, or the like, is applicable to the present invention. In this case, ink may be situated opposite to electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the new functions according to the invention, and the storage medium storing the program codes constitutes the invention.

Further, the storage medium, such as a floppy disk, hard disk, an optical disk, a magneto-optical disk, CD-ROM, CD-R, a magnetic tape, a non-volatile type memory card, and ROM can be used for providing the program codes.

Furthermore, besides the aforesaid functions according to the above embodiments being realized by executing the program codes which are read by a computer, the present invention includes a case where an OS (Operating System) or the like working on the computer performs a part of or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiments.

As has been set forth in the foregoing embodiments, the present invention enables to reduce image deterioration caused by the beading phenomenon, which has been the problem of ink-jet printing, by removing pixels to be printed so as to prevent dots that are consecutive in a printed image.

The present invention is not limited to the above embodiments and various changes and modifications can be made within the spirit and scope of the present invention. Therefore, to appraise the public of the scope of the present invention, the following claims are made.

What is claimed is:

1. A printing apparatus for forming an image on a print medium by discharging ink from a printhead, comprising:

image processing means for reducing density data of an inputted image signal, represented by multi-valued data, by a predetermined amount, in a case where the density data of the inputted image signal has the highest density value which the multi-valued data can represent;

binarization means for binarizing the density data reduced by said image processing means; and print control means for controlling printing of an image comprised of a plurality of dots by the printhead on the print medium in accordance with the density data binarized by said binarization means, wherein said print control means controls such that dots less than the maximum number of dots for the highest density value are printed at an image area having the highest density.

2. The printing apparatus according to claim 1, wherein said printhead discharges ink by utilizing heat energy and includes heat energy transducers for generating the heat energy applied to the ink.

3. The printing apparatus according to claim 1, wherein said print control means controls such that dots constituting 97% to 99% of the maximum number of dots for the highest density value are printed at the image area having the highest density.

4. A printing apparatus for printing an image on a print medium by using a printhead, comprising:

mask pattern generating means for generating a mask pattern where a predetermined bit of the mask pattern is removed;

data conversion means for converting image data by using the mask pattern; and print control means for printing an image based on the image data converted by said data conversion means, wherein said print control means controls such that dots constituting 97% to 99% of the maximum number of dots for the highest density value are printed at an image area having the highest density by the printhead.

5. The printing apparatus according to claim 4, wherein said mask pattern generating means generates an n×m matrix pattern, while changing a position of the predetermined bit so as to prevent generation of texture in a printed image.

6. The printing apparatus according to claim 4, further comprising identifying means for identifying a type of print material used in printing, wherein said mask pattern generating means changes the mask pattern in accordance with the type of print material identified by said identifying means.

7. The printing apparatus according to claim 4, said printing apparatus being an ink-jet printer, further comprising identifying means for identifying a color of ink used in printing, wherein said mask pattern generating means changes the mask pattern in accordance with the color of ink identified by said identifying means.

8. The printing apparatus according to claim 4, further comprising identifying means for identifying a type of print medium used in printing, wherein said mask pattern generating means changes the mask pattern in accordance with the type of print medium identified by said identifying means.

9. The printing apparatus according to claim 4, further comprising identifying means for identifying resolution of the image data, wherein said mask pattern generating means changes the mask pattern in accordance with the resolution of image data identified by said identifying means.

10. The printing apparatus according to claim 4, wherein said print control means performs printing by scanning the printhead a plurality of number of times, and said mask pattern generating means changes the mask pattern at each scan of the plurality of number of times of scanning.

11. The printing apparatus according to claim 4, wherein said printhead discharges ink by utilizing heat energy and includes heat energy transducers for generating the heat energy applied to the ink.

12. A printing apparatus for forming an image on a print medium by discharging ink from a printhead, comprising:
    input means for inputting an image signal represented by multi-valued data; and
    print control means for outputting data based on the inputted image signal to the printhead and causing the printhead to print on the print medium such that a number of dots smaller than a maximum number of printable dots are printed by the printhead in a case where the inputted image signal has the highest density value which the multi-valued data can represent,
    wherein said print control means controls reduction of density data such that dots less than the maximum number of dots for the highest density value are printed at an image area having the highest density, and
    wherein the data output by said print control means is binarized after the reduction of density data.

13. The printing apparatus according to claim 12, wherein said print control means controls such that dots constituting 97% to 99% of the maximum number of dots for the highest density value are printed at the image area having the highest density.

14. A print control method of controlling a printing apparatus which prints an image on a print medium by using a printhead, said method comprising the steps of:
    inputting an image signal represented by multi-valued data;
    controlling reduction of density data based on the image signal; and
    printing an image using the reduced density data,
    wherein the density data is reduced such that dots less than the maximum number of dots for the highest density value are printed at an image area having the highest density, wherein the density data is binarized after said step of controlling reduction of density data and before said printing step.

15. The print control method according to claim 14, wherein in said controlling step dots constituting 97% to 99% of the maximum number of dots for the highest density value are printed at the image area having the highest density.

16. A print control method of controlling a printing apparatus which prints an image on a print medium by using a printhead, comprising:
    a mask pattern generating step of generating a mask pattern where a predetermined bit is removed;
    a data converting step of converting image data by using the mask pattern generated in said mask pattern generating step; and
    a print control step of printing an image based on the image data converted in said data converting step,
    wherein when the image data has the highest density value of values which the image data can represent, dots constituting 97% to 99% of the maximum number of dots for the highest density value are printed at an image area having the highest density by the printhead.

17. The print control method according to claim 16, wherein the mask pattern is an n×m matrix pattern where the image data is thinned out while changing a position of the predetermined bit so as to prevent generation of texture in a printed image.

18. The print control method according to claim 16, the printing apparatus being an ink-jet printer, further comprising an identifying step of identifying a type of ink used in printing, wherein in said mask pattern generating the mask pattern is changed in accordance with the type of ink identified.

19. The print control method according to claim 16, the printing apparatus being an ink-jet printer, further comprising an identifying step of identifying a color of ink used in printing, wherein in said mask pattern generating step, the mask pattern is changed in accordance with the color of ink identified.

20. The print control method according to claim 16, further comprising an identifying step of identifying a type of print medium used in printing, wherein in said mask pattern generating step, the mask pattern is changed in accordance with the type of print medium identified.

21. The print control method according to claim 16, further comprising an identifying step of identifying resolution of the image data, wherein in said mask pattern generating step, the mask pattern is changed in accordance with the resolution of image data identified.

22. A print control apparatus for controlling a printing apparatus which prints an image on a print medium by using a printhead, comprising:
    mask pattern generating means for generating a mask pattern where a predetermined bit is removed;
    data conversion means for converting image data by using the mask pattern generated by said mask pattern generating means; and
    print control means for printing an image based on the image data converted by said data conversion means,
    wherein when the image data has the highest density value of values which the image data can represent, dots constituting 97% to 99% of the maximum number of dots for the highest density value are printed at an image area having the highest density by the printhead.

23. The print control apparatus according to claim 22, wherein the mask pattern is an n×m matrix pattern where the image data is thinned out by said data conversion means while changing a position of the predetermined bit so as to prevent generation of texture in a printed image.

24. The print control apparatus according to claim 22, said printing apparatus being an ink-jet printer, further comprising identifying means for identifying a type of ink used in printing, wherein said mask pattern generating means changes the mask pattern in accordance with the type of ink identified.

25. The print control apparatus according to claim 22, said printing apparatus being an ink-jet printer, further comprising identifying means for identifying a color of ink used in printing, wherein said mask pattern generating means changes the mask pattern in accordance with the color of ink identified.

26. The print control apparatus according to claim 22, further comprising identifying means for identifying a type of print medium used in printing, wherein said mask pattern generating means changes the mask pattern in accordance with the type of print medium identified.

27. The print control apparatus according to claim 22, further comprising identifying means for identifying resolution of the image data, wherein said mask pattern generating means changes the mask pattern in accordance with the resolution of image data identified.

28. A print control method for controlling a printer which forms an image on a print medium by discharging ink from a printhead, comprising the steps of:

reducing density data of an inputted image signal, represented by multi-valued data, by a predetermined amount, in a case where the density data of the inputted image signal has the highest density value which the multi-valued data can represent;

binarizing the density data reduced in said reducing step; and controlling printing of an image comprised of a plurality of dots by the printhead on the print medium in accordance with the density data binarized in said binarizing step, wherein in said controlling step, dots less than the maximum number of dots for the highest density value are printed at an image area having the highest density.

29. The print control method according to claim 28, wherein in said controlling step dots constituting 97% to 99% of the maximum number of dots for the highest density value are printed at the image area having the highest density.

* * * * *

UNITED STATES PATENT AND TRADEMARK OFFICE
CERTIFICATE OF CORRECTION

PATENT NO. : 6,467,866 B1
DATED : October 22, 2002
INVENTOR(S) : Nagoshi et al.

It is certified that error appears in the above-identified patent and that said Letters Patent is hereby corrected as shown below:

Title page,
Item [*] Notice:, the following should be inserted:
-- This patent issued on a continued prosecution application filed under 37 CFR 1.53(d), and is subject to the twenty year patent term of 35 U.S.C. 154(a)(2). --.

Column 2,
Line 12, "pixels" should read -- pixel --; and
Line 54, "not:" should read -- not --.

Column 5,
Line 8, "an other" should read -- another --;
Line 33, "an" should read -- a --; and
Line 64, "has" should read -- has a --.

Column 6,
Line 52, "printhead" should read -- printhead assembly --.

Column 8,
Line 40, "printhead" should read -- printhead assembly --.

Column 9,
Line 40, "Step" should read -- step --.

Column 10,
Lines 42 and 46, "printhead" should read -- printhead assembly --.

Column 11,
Line 30, "printhead" should read -- printhead assembly --.

Column 12,
Line 13, "so-called an" should read -- a so-called --.

Column 14,
Line 5, "part or" should read -- part of or the --; and
Line 16, "appraise" should read -- apprise --.

UNITED STATES PATENT AND TRADEMARK OFFICE
CERTIFICATE OF CORRECTION

PATENT NO. : 6,467,866 B1
DATED : October 22, 2002
INVENTOR(S) : Nagoshi et al.

It is certified that error appears in the above-identified patent and that said Letters Patent is hereby corrected as shown below:

<u>Column 16,</u>
Line 23, "generating" should read -- generating step, --.

Signed and Sealed this

Twenty-second Day of July, 2003

JAMES E. ROGAN
*Director of the United States Patent and Trademark Office*